000
United States Patent Office 3,361,618
Patented Jan. 2, 1968

3,361,618
PROCESS FOR TREATING WASTE PAPER PULP
Russell W. McKinley, Dunstable, Mass., assignor, by mesne assignments, to Packaging Corporation of America, a corporation of Delaware
No Drawing. Filed Feb. 17, 1965, Ser. No. 433,495
8 Claims. (Cl. 162—8)

ABSTRACT OF THE DISCLOSURE

Reducing the flavor and odor components of a waste paper pulp by adjusting the pH of a crude aqueous pulp with a buffering agent and subjecting the buffered pulp to heat and pressure and rapidly releasing the pressure and sweeping the exhaust vapors from said pulp.

This invention relates to a process for deodorizing and removing undesirable flavor constituents from paper pulp, particularly waste fibers.

It is well known that the paper industry uses large quantities of waste paper in the manufacture of papers and paperboards, particularly where a low cost product is desired. One of the drawbacks associated with paper products made from waste or reclaimed paper fibers has been odor or flavor components which remain and appear in the final paper product prepared from waste paper stocks. Some virgin chemical pulps also have similar off odors or flavors. These factors have previously militated against certain end uses of the paper products, particularly in the manufacture of food container. The problem becomes especially acute where the foodstuff is of the type which "picks up" the odor and/or flavor from the paper product and thereby becomes less attractive to consumers.

Thus, many foodstuffs requiring packaging in paper goods must necessarily be restricted to using products made from essentially odor or flavor free virgin stocks to prevent ultimate contamination of the packaged food from an odor or flavor viewpoint and resultant consumer rejection.

Accordingly, it is an object of the present invention to provide a process for treating waste or other paper pulps to substantially reduce flavor or odor components.

A further object is the provision of a process for reducing flavor or odor components in paper stocks by simple and economical means.

A still further object is the provision of a process for reducing flavor or odor components in papre stocks which is adaptable to the paper making process.

A still further object is the provision of an improved waste paper reclaiming process which reduces the odor and/or flavor components to a substantial degree.

A still further object is the provision of a process which will produce a paper product from a waste or other paper pulp which is suitable for packaging foods having a high susceptibility for odor and flavor pickup.

The fulfillment of these and other objects of this invention will be more readily apparent by reference to the following spacification and appended claims.

In one broad form the present invention is a process for deodorizing and deflavoring a paper pulp which comprises adjusting the pH of a crude, aqueous paper pulp suspension by the addition of a buffering type compound to produce a final pH after pressurization of from 5.5 to 7.5, introducing the aqueous pulp into a confined pressure zone, heating the pulp to produce a steam pressure of from about 40–75 p.s.i. (absolute) 25–60 p.s.i. gauge, and releasing the pressure on the pulp in a period of less than five seconds, and sweeping the exhaust vapors away from the pulp.

The invention also relates to the deodorized and deflavored pulp produced by this process.

The starting material, as indicated above, may be waste paper including particularly waste newsprint which has a particularly severe odor and flavor, or chemical pulps which have characteristic odor or flavors.

The raw waste paper is for this process defibered by conventional technique such as breaker beaters or hydrapulpers, the main objective being to separate the raw paper pulp into discrete fibers. The consistency of the final pulp is usually low ordinarily in the order of 1 to 2%. For the purposes of the present invention the defibered stock is thickened or increased in consistency (pulp to water ratio) principally for handling and economic reasons. The consistency after thickening is preferably of the order of from about 15 to 30%. Conventional thickener equipment is used in this step.

The adjustment of pH is conventionally carried out by addition of a buffer salt or an agent which forms a buffer system. These buffer agents include sodium carbonate, potassium carbonate, disodium phosphate, or any weak alkali. Nonhydroxide buffer agents are preferred. The adjustment of pH should be such as to result in a final pH, after the pressurization and release steps, of from about 5.5 to 7.5. It has been found that the pH decreases in these steps and that, ordinarily, adjustment of the pH in the range of 6.0 to 9.5 gives a satisfactory final pH within the indicated range, although each batch of raw material should be investigated for optimum results.

The pressurizing step may be carried out in any suitable equipment, such as an autoclave paper digester or the like. The pressure as indicated should be in the range of about 25 to 60 p.s.i. gauge steam. Temperatures corresponding to these steam pressures are from about 260 to 310° F. The time at which the pulp is held at this pressure may range from 1 to >1 minutes.

The pressure release step is considered an important factor of the present invention. It has been found that by rapid release of the steam pressure, the components responsible for odor and/or flavor are steam distilled with the released steam. The rapid release also permits rupture of some of the paper particles and accompanying release of odorous materials. Exhaust vapors must be swept out after or during pressure release. The time of release can, accordingly, cover a period of up to about 5 seconds, preferably from 0.5 to 3 seconds.

The resultant pulp after treatment is permitted to cool and is adjusted to the proper consistency for paper goods manufacture. The pH may be further adjusted at this point of the paper making process.

The following example illustrates the treatment of paper pulp in accordance with this invention.

Example

A quantity of aqueous defibered #1-Newsprint pulp was found to have a pH of 6.1. Sodium carbonate in an amount equal to 0.5% by weight of air dry fiber was mixed with the pulp to give the pulp a pH of 9.1. This stock was introduced into the pressure chamber and brought to 30 p.s.i. gauge (260° F.). The pressure was then suddenly released (<1 second) and vapors were exhausted from the chamber. The treated fiber slurry was removed from the pressure chamber and found to have a pH of 7.5. This stock was then diluted to a consistency which permitted making handsheets (about 3 to 4%). To illustrate the efficacy of the treatment, samples of the handsheets representing both untreated and treated pulp were placed in glass jars with apples. The ratio of handsheet stock to the apple and the glass jar's volume were arranged to simulate conditions existing in commercial apple cold storage. Testing the handsheets in the presence of apples was aimed at those grades of apples which are normally packed in bushel boxes with molded pulp trays as layer separators. The apples were put into cold storage at 33° F. and samples were withdrawn at periodic intervals of 28 days, 56 days, 84 days, 140 days. Applesauce made from the apples was used as a sensitive medium which would exhibit the development or nondevelopment of mustiness or boardiness in the apples while in cold storage. The following tables serve to show performance of the treated handsheets vs. untreated (control) handsheets.

The odor and flavor constituents remaining in the paper product after treatment is evaluated by the "Flavor profile Method" of Cairncross and Sjöström Food Technology, 4(8):308 (1950).

The following general results were obtained.

ODOR CONSTITUENTS—COVERED CONTAINER

| Character Note | Not Moisturized | | Moisturized | | Water Soaking | |
|---|---|---|---|---|---|---|
| | Control | Treated | Control | Treated | Control | Treated |
| Cardboard | Present | None | Present | None | Present | None. |
| Musty | do | do | do | do | do | Do. |

FLAVOR CONSTITUENTS

| Character Note | Water | | Transfer to— | | | | +Applesauce | |
|---|---|---|---|---|---|---|---|---|
| | | | Butter | | Chocolate | | | |
| | Control | Treated | Control | Treated | Control | Treated | Control | Treated |
| Musty | Present | None | | | | | | |
| Cardboard | do | do | Present | None | Present | None | Papery | None. |

The following specific results were obtained in the apple tests.

TABLE I.—FLAVOR PROFILES—APPLESAUCE AFTER 28 DAYS' COLD STORAGE

AROMA

| With Untreated Stock | | With Treated Stock | |
|---|---|---|---|
| Amplitude 1: | | Amplitude 1½: | |
| Cardboard | 1 | Sweet | 1½ |
| Sweet | 1 | Sour | 1½ |
| Sour | 1½ | Apple | 1 |
| Apple | 1 | Fruity or apple core | 1½ |

FLAVOR-BY-MOUTH

| Amplitude ½: | | Amplitude 1: | |
|---|---|---|---|
| Musty Cardboard | 1 | Sweet | 1½ |
| Sweet | 1½ | Sour | 2 |
| Sour | 2 | Mealy | |
| Mealy | | Salivating | 1 |
| Salivating | 1 | Green | 1 |
| Green | ½ | Astringent and drying | 1 |
| Astringent and drying | 1½ | Apple | 1 |
| Apple | 1 | Bitter | )( |
| | | Pear-like or apple core | 1 |

Key.—)( = Threshold; ½ = Threshold to Slight; 1 = Slight; 1½ = Slight to Moderate; 2 = Moderate.

TABLE II.—FLAVOR PROFILES—APPLESAUCE AFTER 56 DAYS' COLD STORAGE

AROMA

| With Untreated Stock | | With Treated Stock | |
|---|---|---|---|
| Amplitude ½: | | Amplitude 1: | |
| Musty cardboard | 1½ | Sweet | 1½ |
| Sweet | 1 | Sour | 1 |
| Sour | 1 | Apple | 1 |
| Apple | 1 | Fruity | ½ |

FLAVOR-BY-MOUTH

| Amplitude ½: | | Amplitude 1: | |
|---|---|---|---|
| Musty cardboard | 1 | Sweet | 2 |
| Sweet | 2 | Sour | 2 |
| Sour | 2 | Salivating | 1 |
| Salivating | 1 | Green | ½ |
| Green | ½ | Astringent and drying | 1 |
| Astringent and drying | 1½ | Apple | 1 |
| Apple | 1 | | |

TABLE III.—FLAVOR PROFILES—APPLESAUCE AFTER 84 DAYS' COLD STORAGE

AROMA

| With Untreated Stock | | With Treated Stock | |
|---|---|---|---|
| Amplitude ½: | | Amplitude 1: | |
| Musty cardboard | 1½ | Sweet | 1½ |
| Sweet | 1 | Sour | 1 |
| Sour | 1 | Apple | ½ |
| Apple | ½ | Fruity | ½ |

FLAVOR-BY-MOUTH

| Amplitude ½: | | Amplitude 1: | |
|---|---|---|---|
| Musty cardboard | ½ | Sweet | 1½ |
| Sweet | 1½ | Sour | 2 |
| Sour | 2 | Salivating | 1 |
| Salivating | 1 | Green | ½ |
| Green | ½ | Astringent and Drying | 1 |
| Astringent and drying | 1½ | Apple | 1 |
| Apple | 1 | Musty | )( |

TABLE IV.—FLAVOR PROFILES—APPLESAUCE AFTER 140 DAYS' COLD STORAGE

AROMA

| With Untreated Stock | | With Treated Stock | |
|---|---|---|---|
| Amplitude )(: | | Amplitude 1: | |
| Musty cardboard | 2 | Sweet | 1 |
| Sweet | 1 | Sour (fermented) | 1½ |
| Sour | 1 | Apple | ½ |
| Apple | ½ | | |

FLAVOR-BY-MOUTH

| | | | |
|---|---|---|---|
| Amplitude )(: | | Amplitude 1: | |
| Musty cardboard | 1½ | Sweet | 1½ |
| Sweet | 1½ | Sour | 2 |
| Sour | 1½ | Salivating | 1 |
| Salivating | 1 | Astringent and Drying | 1 |
| Astringent and drying | 1½ | Apple | ½ |
| Apple | ½ | | |

While the foregoing examples and tests illustrate certain specific embodiments of the invention, it should be understood that the method can be applied using a variety of starting materials, reagents and conditions to achieve the desired result.

In many instances the odor-flavor imparting factors will not be entirely removed but will always be substantially reduced. Some odors in paper goods are essentially eliminated initially but by their nature redevelop over long periods of standing. It is the initial removal and prevention or retarding of such redevelopment which is the objective in such a case.

The process can be carried out as a batch technique or as part of a continuous process by suitable use of conventional equipment.

While several particular embodiments of this invention are shown above, it will be understood, of course, that the invention is not to be limited thereto, since many modifications may be made, and it is contemplated, therefore, by the appended claims, to cover any such modifications as fall within the true spirit and scope of this invention.

I claim:

1. A process for reducing the flavor and odor components of waste paper pulp which comprises adjusting the pH of a crude aqueous pulp by the addition thereto of a buffering agent and thereafter subjecting the buffered pulp to the action of heat and steam pressure, the pressure being in the range of about 40 to 75 p.s.i. absolute and rapidly releasing the pressure on the pulp over a period of less than 5 seconds and sweeping the exhaust vapors from said pulp, the amount of buffering agent added being such as to result in a final pH after treatment with said heat and pressure in the treated aqueous pulp of from about 5.5 to 7.5.

2. The product of the process of claim 1.

3. A process for reducing the odor and flavor characteristics of a crude waste paper pulp which comprises adjusting the pH of a crude aqueous pulp by the addition thereto of a buffering agent, maintaining the buffered aqueous pulp in a confined pressure zone and applying heat to the pulp to result in a temperature above about 260° F. and a resultant steam pressure of from about 40 to 75 p.s.i. absolute, and rapidly releasing the steam pressure on said pulp over a period of up to about 5 seconds, and sweeping the vapors from said pulp, the amount of said buffering agent added being such as to result in a final pH after treatment under heat and pressure of from 5.5 to 7.5.

4. The process of claim 3 wherein the buffering agent is sodium carbonate.

5. The process of claim 3 wherein the temperature of the pulp under pressure ranges from 260 to 310° F.

6. A process according to claim 3 wherein the initial consistency of the pulp is from 15 to 30%.

7. The process of claim 3 wherein the buffered pulp is maintained at the elevated temperature and pressure for a period of from 1 to 30 minutes.

8. A process for reducing the odor and flavor characteristics of a paper pulp prepared from waste newsprint which comprises defibering a waste newsprint to form an aqueous slurry, concentrating the slurry so formed to a consistency of from 15 to 30 percent, adjusting the pH of the pulp by addition of a buffering agent, heating the pulp under conditions of elevated temperature and steam pressure, ranging from about 260 to 310° F. and from 40 to 75 p.s.i. absolute, and rapidly reducing the pressure on the pulp to atmospheric conditions over a period of up to about 5 seconds and sweeping the exhaust vapors from said pulp, the amount of buffering agent added to the pulp being such as to result in a final pH after treatment under heat and pressure of from 5.5 to 7.5.

References Cited

UNITED STATES PATENTS 2,148,448   2/1939   Edwards _____ 162—21 X

OTHER REFERENCES

West: Deinking of Paper, Institute of Paper Chemistry, Appleton, Wis., April 1943, pp. 5-11.

S. LEON BASHORE, *Primary Examiner.*